(12) United States Patent
Kopansky et al.

(10) Patent No.: US 12,535,400 B2
(45) Date of Patent: Jan. 27, 2026

(54) SYSTEMS AND METHODS FOR OPTICAL PARTICLE DETECTION

(71) Applicant: Eaton Intelligent Power Limited, Dublin (IE)

(72) Inventors: Gregory Kopansky, Philadelphia, PA (US); Stephen T. Showalter, Milmont Park, PA (US); Xin Pu, Chester Springs, PA (US); John Joseph Zielinski, Southampton, PA (US)

(73) Assignee: Eaton Intelligent Power Limited (IE)

( * ) Notice: Subject to any disclaimer, the term of this patent is extended or adjusted under 35 U.S.C. 154(b) by 120 days.

(21) Appl. No.: 18/517,296

(22) Filed: Nov. 22, 2023

(65) Prior Publication Data

US 2024/0175799 A1    May 30, 2024

Related U.S. Application Data

(60) Provisional application No. 63/385,552, filed on Nov. 30, 2022.

(51) Int. Cl.
| | |
|---|---|
| *G01N 15/1434* | (2024.01) |
| *G01N 15/10* | (2024.01) |
| *G01N 15/14* | (2024.01) |

(52) U.S. Cl.
CPC ..... *G01N 15/1434* (2013.01); *G01N 15/1459* (2013.01); *G01N 2015/1027* (2024.01); *G01N 2015/1493* (2013.01)

(58) Field of Classification Search
USPC ........................................................ 356/335
See application file for complete search history.

(56) References Cited

U.S. PATENT DOCUMENTS

| | | |
|---|---|---|
| 7,288,139 B1 | 10/2007 | Showalter |
| 11,313,779 B2 | 4/2022 | Kopansky et al. |
| 2006/0244946 A1 | 11/2006 | Cox |
| 2010/0225913 A1 | 9/2010 | Trainer |
| 2013/0037726 A1 | 2/2013 | Kiesel |
| 2013/0137087 A1 | 5/2013 | Wilson |

FOREIGN PATENT DOCUMENTS

| | | |
|---|---|---|
| EP | 4 379 351 A1 | 6/2024 |
| WO | 2008029262 A2 | 3/2008 |

OTHER PUBLICATIONS

ESSR for Application No. 23212060.0, dated Apr. 25, 2024, 10 pages.

*Primary Examiner* — Md M Rahman
(74) *Attorney, Agent, or Firm* — Merchant & Gould P.C.

(57) ABSTRACT

A particle detection system includes a light source configured to generate a light beam, a first collimator lens configured to channel the light beam into the chamber through a first sidewall, the chamber including openings on a second sidewall opposite the first sidewall, and a second collimator lens configured to channel light received from the openings to a light detector. A method for detecting particles flowing through a chamber includes generating a light beam, channeling the light beam into the chamber via a first collimator lens, detecting light escaped from the chamber via a plurality of openings formed at a second sidewall of the chamber opposite the first sidewall, at a light detector via a second collimator lens located outside the second sidewall, and determining parameters of the one or more particles flowing through the chamber based on the received escaped light.

24 Claims, 8 Drawing Sheets

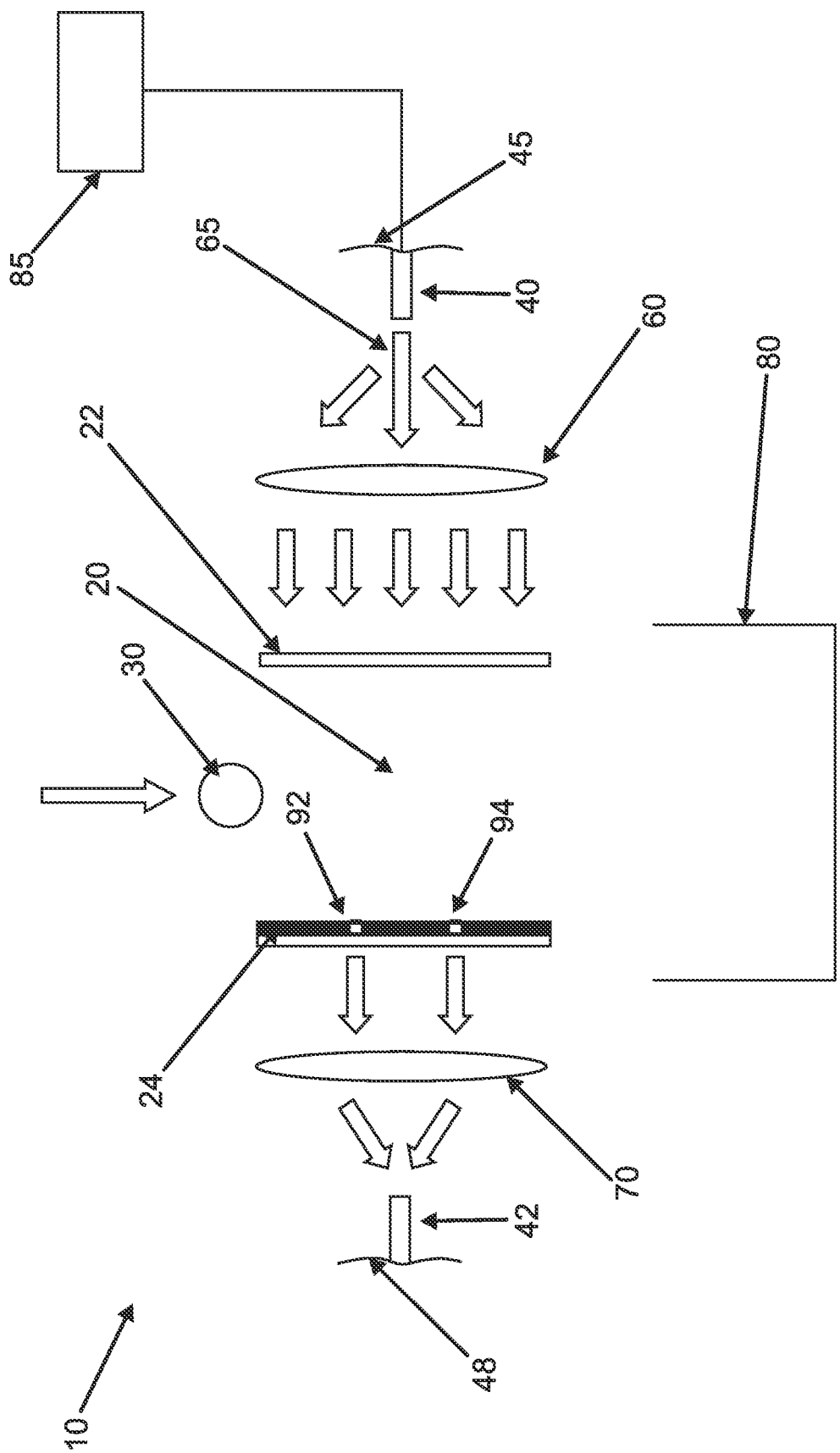

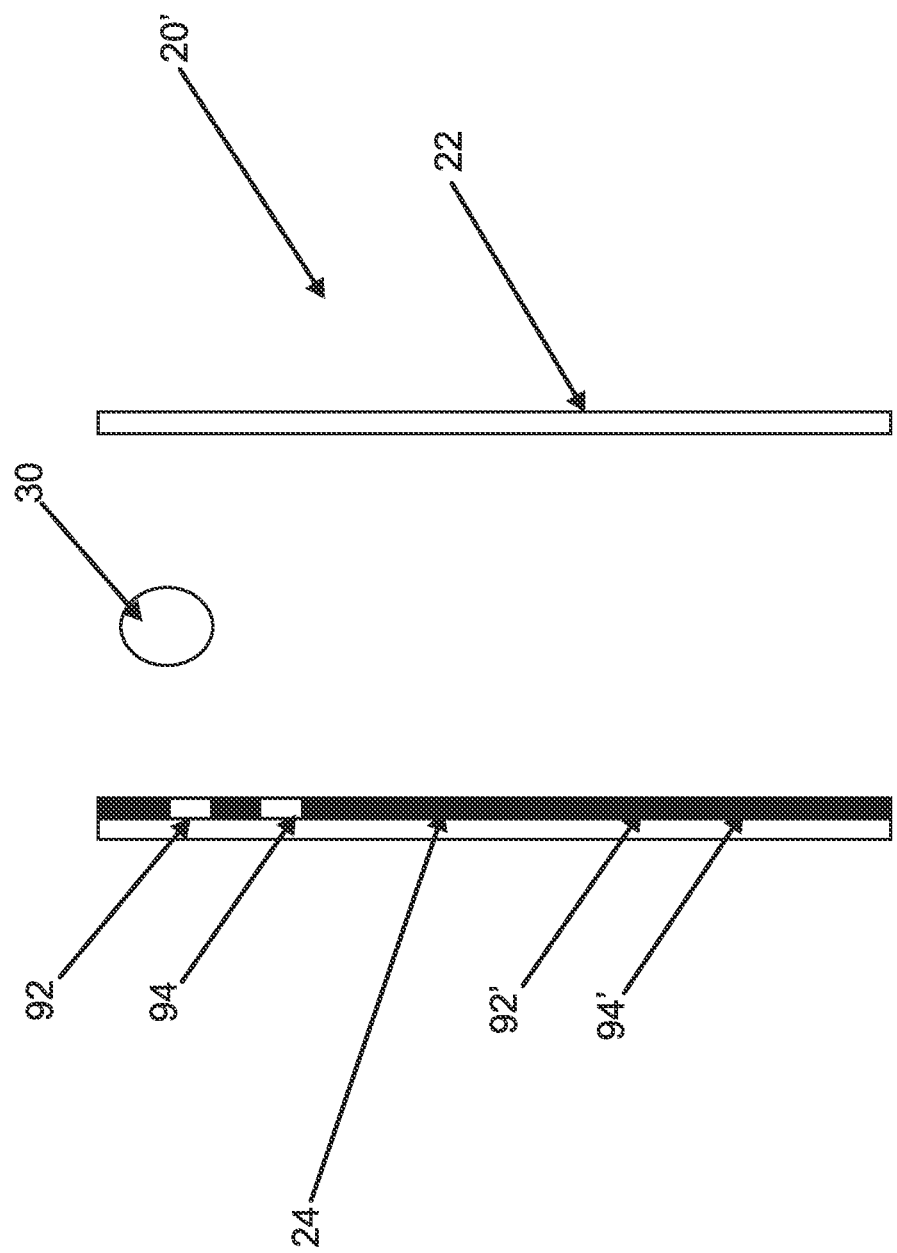

*FIG. 2*

Material Discrimination Parameters for Temp 50 to 140c

| Temp C | m | b |
|---|---|---|
| 50 <= T < 70 | 0.000012 | -0.003555 |
| 70 <= T < 90 | 0.000018 | -0.003440 |
| 90 <= T < 110 | 0.000031 | -0.009143 |
| 110 <= T < 130 | 0.000030 | -0.018300 |
| 130 <= T <= 140 | 0.000060 | -0.010000 |

SYSTEMS AND METHODS FOR OPTICAL PARTICLE DETECTION

CROSS-REFERENCE TO RELATED APPLICATION

This application claims priority to and the benefit of U.S. Provisional Patent Application No. 63/385,552, filed on Nov. 30, 2022, which is hereby incorporated by reference in its entirety.

BACKGROUND

Examples of the present disclosure generally relates to debris or particle detection systems, including liquid debris or particle detection systems that may include a fiber optic sensor and which may be used to detect metals and non-metals.

SUMMARY

In one aspect, the technology relates to a particle detection system including a light source configured to generate a light beam, a first collimator lens outside a chamber and configured to channel the generated light beam from the light source into the chamber through a first sidewall of the chamber, the chamber being configured to hold fluid therein and including a plurality of openings on a second sidewall thereof, the second sidewall being opposite the first sidewall, and a second collimator lens on an opposite side of the chamber from the first collimator lens, the second collimator lens being configured to channel light received from the plurality of openings to a light detector.

In an example of the above aspect, the first sidewall is transparent to the generated light beam, and the second sidewall is opaque to the generated light beam. In another example, the system further includes a controller configured to control the light generator and the light detector, wherein the controller and the plurality of openings constitute one or more velocity measurement systems. For example, the plurality of openings include one or more pairs of openings, and each velocity measurement system includes one pair of openings including an upper opening and a lower opening. In another example, the controller is configured to measure a timing of passage of one or more particles flowing through the chamber based on a detected light transmitted through one of the pairs of openings.

In yet other examples, the one or more velocity measurement systems include a first velocity measurement system including a first upper opening and a first lower opening, and a second velocity measurement system including a second upper opening and a second lower opening. For example, the controller is configured to measure a first velocity of the particle at the first velocity measurement system and a second velocity of the particle at the second velocity measurement system. In further examples, the controller is configured to determine a size of the one or more particles based on a comparison of the first velocity and the second velocity. In other examples, the system further includes one or more sensors configured to measure a fluid flow through the chamber, wherein the controller is coupled to the one or more sensors.

In another example of the above aspect, the controller is configured to calculate a length of a particle as $L=V \times T$, wherein L is a length of the particle, V is a velocity of the particle passing through one of the first velocity measurement system and the second velocity measurement system, and T a period between a time at which a leading edge of the particle reaches an end of a first opening of the one of the first velocity measurement system and the second velocity measurement system, and a time at which the leading edge of the particles reaches an end of a second opening of the one of the first velocity measurement system and the second velocity measurement system. For example, at least one of the light source and the light detector includes a fiber optic cable, the fiber optic cable including one of a single optical fiber and a plurality of optical fibers. In another example, each of the light source and the light detector includes one of an LED, a photo sensor, and a fiber optic cable. In yet another example, the system further includes a receptable configured to collect the particles flowing through the chamber, the receptable being located downstream from the chamber in a direction of the particle.

In another aspect, the technology relates to a method for detecting one or more particles flowing through a chamber, the method including generating a light beam at a light source, channeling the generated light beam into the chamber via a first collimator lens outside a first sidewall of the chamber, detecting light escaped from the chamber via a plurality of openings, the plurality of openings being formed at a second sidewall of the chamber opposite the first sidewall, at a light detector via a second collimator lens located outside the second sidewall, and determining one or more parameters of the one or more particles flowing through the chamber based on the received escaped light.

In examples of the above aspect, detecting the escaped light via the plurality of openings includes receiving the escaped light via a plurality of pairs of openings. In other examples, detecting the escaped light via the plurality of openings includes receiving the escaped light via one of one pair of openings and two pairs of openings. In further examples, detecting the escaped light includes receiving the escaped light via a first pair of openings including a first upper opening and a first lower opening, and via a second pair of openings including a second upper opening and a second lower opening. In addition examples, determining the one or more parameters includes determining one or more of a size of the one or more particles, and a type of material of the one or more particles. In further examples, determining the one or more parameters includes determining a velocity of a particle based on determined a timing of the particle between openings of one of the pairs of openings.

In other examples of the above aspect, the method further includes determining a length of the particle as $L=V \times T$, wherein L is a length of the particle, V is a velocity of the particle passing through one of the first velocity measurement system and the second velocity measurement system, and T a period between a time at which a leading edge of the particle reaches an end of a first opening of the one of the first velocity measurement system and the second velocity measurement system, and a time at which the leading edge of the particles reaches an end of a second opening of the one of the first velocity measurement system and the second velocity measurement system. In examples, generating the light beam at the light source includes generating the light beam at one of a first fiber optic cable, a first LED, and a first photo sensor, detecting the light escaped from the chamber includes detecting the escaped light at a second fiber optic cable, a second LED, and a second photo sensor.

In yet another example, channeling the generated light beam into the chamber includes channeling the generated light beam through a first transparent sidewall of the chamber. In another example, detecting the light escaped from the chamber includes detecting the light escaped from a second opaque sidewall of the chamber, the second opaque sidewall including the plurality of openings. In a further example, the method further includes collecting the one or more particles that flowed through the chamber in a receptable.

BRIEF DESCRIPTION OF THE DRAWINGS

FIGS. 1A-1C are schematic views of a particle detection system, according to examples of the present disclosure.

FIG. 2 is a look-up table to determine a type of material of the flowing particles, according to examples of the disclosure.

DETAILED DESCRIPTION

Figure 1C:
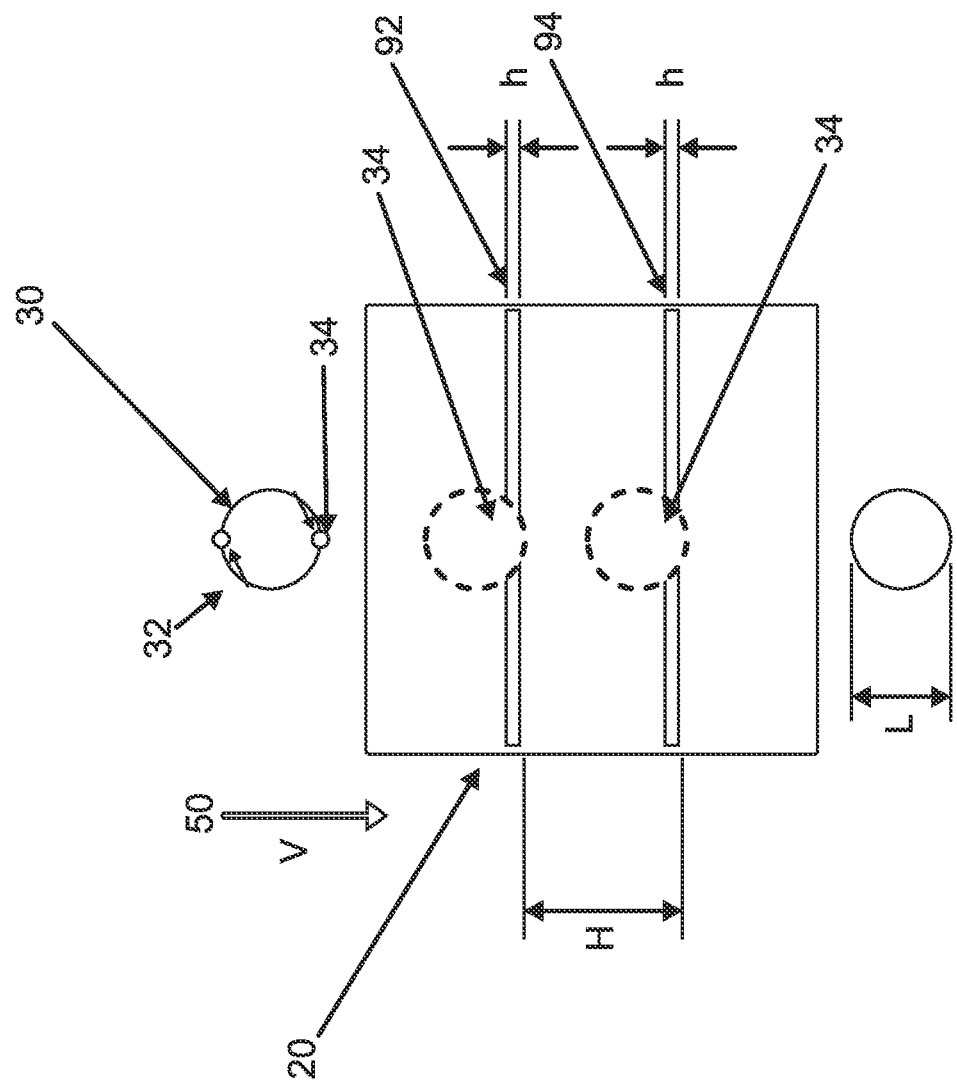

Debris monitoring systems can, for example, be used to detect the presence of wear particles in lubricating oils that may be transferred from, e.g., oil-wetted surfaces of gears and bearings under mechanical stress. Automatic debris monitoring is often preferred from a maintenance perspective, as debris monitoring may eliminate the need for certain routine inspections, and may preempt potential failure should a crack or other failure deteriorate faster than an inspection interval. For example, the aerospace industry is trending towards "on-condition" maintenance, which means that the Line Replaceable Unit (LRU) may not require routine maintenance or inspections, and may preferably fail in a "soft" manner (i.e., the LRU will signal when it needs calibration or service, while maintaining some level of degraded operability).

There are two general classes of debris monitors: (1) capturing monitors and (2) flow-through monitors. Capturing monitors or sensors may, for example, employ a high-strength magnet to attract ferrous particles and detects particles via inductive principles. The particles can then be inspected and further tested to determine if they are representative of gear or bearing steel, or if they are nuisance debris. A potential challenge with capturing type sensors is that the build-up of particles may affect the accuracy of size discrimination and eventually the sensor could become "saturated" and unresponsive to additional particle captures, and may therefore require routine maintenance.

Flow-through debris monitors generally work on the principle of induction and may respond to both ferrous and non-ferrous debris. Since flow-through debris monitors do not capture particles they generally do not require routine maintenance. However, particle inspections are not necessarily a feature or capability.

With the introduction of metal/non-metal hybrid bearings (e.g., steel races with ceramic rolling elements), determining a most appropriate debris monitoring technique, and there is currently a need for the detection of non-metals in the aerospace industry. That is, hybrid bearings are now in use in many industries. Hybrid bearing have many important features or qualities that can improve engine efficiencies. Among other things, employing hybrid bearings may provide lower weight, higher DN velocity (bearing diameter multiplied by the operating velocity), higher temperature operation, less dependence on lubrication, and lower centrifugal forces (due to lighter weight), which may permit their operation at higher velocities.

However, the deployment of hybrid bearings may, among other things, require a viable technology that may need to be approved for various applications such as, e.g., flight applications, and that can detect non-metals. Accordingly, there is a technical problem in determining an appropriate debris monitoring technique for hybrid bearings and hybrid systems. Consequently, there is a need for solutions/options that address one or more of the aforementioned challenges. The foregoing discussion is intended only to illustrate examples of the present field and should not be taken as a disavowal of scope. A technical solution to the above technical problem includes the use of optical techniques to detect the presence of particles, as well to determine their respective sizes and material types.

FIGS. 1A-1C are schematic views of a particle detection system, according to examples of the present disclosure. FIG. 1A generally illustrates a debris detection system, or debris detector, 10 according to examples of the present disclosure. For example and without limitation, the debris detection system 10 may be used in various mechanical-fluid configurations, such as, e.g., a gearbox for various vehicles. In examples, the debris detection system 10 may include a chamber 20. In an example, the chamber 20 may include a first sidewall 22 that is transparent to light, and a second sidewall 24, opposite the first sidewall 22, that is opaque to light but that includes a plurality of openings 92 and 94. In further examples, the chamber 20 may be a flow-through chamber, where the particles 30 flow therethrough, and may be configured to hold a fluid therein, the fluid including the particles 30 flowing from one end of the chamber 20 such as, e.g., a top end, to another end of the chamber 20 such as, e.g., a bottom end thereof under the driving force of, e.g., gravity.

In various examples, the system 10 may include one or more optical fibers 40, and collimator lenses 60 and 70. In an example, a first collimator lens 60 is configured to channel a light beam 65 generated from a light source 45 and provided through an optical fiber 40 into the chamber 20. In examples, a second collimator lens 70 is configured to channel light escaping from chamber 20 via, e.g., the openings 92 and 94, to a light receiver 48 through another optical fiber 42. In other examples, the system 10 may include the plurality of openings 92 and 94 through which light that entered the chamber 20 can escape therethrough and transmit onto the light receiver 48 via the second collimator lens 70 and the optic cable 42. In contrast with some optical systems that may require a prism, examples of the present disclosure may be provided without a prism.

In various examples, a debris particle 30 held in the fluid (not shown) and passing through the chamber 20 may block a light path between the chamber 20 and the second collimator 70, and may alternatively block light and allow light to pass through the openings 92 and 94 as it travels downward. In examples, debris size may be detected by the system, for example, by measuring the light transmitted through the chamber 20 by measuring the light signal amplitude that is blocked by the particulate 30. For example, the amplitude of the light signal escaping from the chamber 20 onto the collimator lens 70 is proportional to the amount of light that is blocked by the particle 30. For example, a 100% amplitude means that no light is blocked by the particle 30, and that the particle 30 has thus passed by the corresponding opening 92 or 94. In another example, an amplitude of, e.g., 30% means that only 30% of the light that would have been transmitted to an opening had the particle 30 not been present is being transmitted due to the blocking presence of the particle 30 in front of the opening 92 or 94. In various examples, the existence of particles and attributes thereof such as, e.g., particle size, may be detected without regard to the particle's inherent material composition. In various examples, changes in light transmitted to the second collimator lens 70 may be correlated to aspects or attributes associated with one or more of the particles 30.

In various examples, in operation, the particle 30 travels through the chamber 20 from a top end thereof to a bottom end thereof, e.g., under the driving force of gravity, and as the particle passes in front of the first opening 92, progressively blocks the light and progressively prevents the light from escaping through the first opening 92 until it completely blocks the light form escaping through the first opening 92. As the particle 30 continues to travel downward, the particle 30 may pass by the first opening 92, no longer blocking the light therethrough, and may then pass in front of the second opening 94, thereby progressively blocking the light and progressively preventing the light from escaping through the opening 94 at it progresses downwards. In various examples, the time that the particle takes to pass through by openings 92 and 94 may provide sufficient information to determine the velocity of the particle flowing through the fluid present in the chamber 20. For example, the velocity of the particle may be measured as the distance between each opening 92 and 94 divided by the amount of time taken by the particle to travel that distance, as further discussed below with respect to the description of FIG. 1C.

In examples, the system 10 may also include a receptable 80 located under the chamber 20 and configured to collect the particles 30 after they flow through the chamber 20. For example, the particles 30 that are collected at the receptable 80 may be analyzed, inspected and further tested to determine, e.g., if they are representative of gear or bearing steel, or if they are nuisance debris. In other examples, the chamber 20, light generator 45 and light receiver 48 may be coupled to a processor 85 similar to the processors and controllers further discussed below with respect to FIG. 7.

FIG. 1B illustrates a chamber 20' that may be part of a particle detection system such as system 10 discussed above with respect to FIG. 1A. In various examples, the chamber 20' includes, in addition to a first pair of openings 92 and 94, a second pair of openings 92' and 94'. In various examples, in operation, the particle 30 travels through the chamber 20 from a top end thereof to a bottom end thereof, e.g., under the driving force of gravity, and as the particle passes in front of the first opening 92, progressively blocks the light and progressively prevents the light from escaping through the first opening 92. As the particle 30 continues to travel downward, the particle 30 may pass by the first opening 92, no longer blocking the light therethrough, and pass in front of the second opening 94, thereby also progressively blocking the light and progressively preventing the light from escaping through the opening 94. In further examples, in operation, the particle 30 continues to travel through the chamber 20 e.g., under the driving force of gravity, below both openings 92 and 94 and in front of opening 92'. For example, the particle passes in front of the first opening 92', progressively blocks the light and progressively prevents the light from escaping through the first opening 92'. As the particle 30 continues to travel downward, the particle 30 may pass by the first opening 92', no longer blocking the light therethrough, and pass in front of the second opening 94', thereby progressively blocking the light and progressively preventing the light from escaping through the opening 94'. Based on a timing of the passage of the particle 30 in front of both pairs of openings 92/94 and 92'/94', it may be possible to calculate various parameters relative to the particle such as, e.g., the velocity of the particle and the size of the particle. In other examples, additional parameters relative to the particle 30 may be derived such as, e.g., the type of material, or the density of the particle 30, as discussed in greater detail below with respect to the description of FIG. 5.

FIG. 1C illustrates a path of a particle 30 as it travels through the chamber 20, in various examples, as well as various types of information that may be determined based on the timing of travel of the particle 30 along the direction 50 from a top portion to a bottom portion of the chamber 20. In example, the leading edge 34 of the particle 30 may pass in front of the first opening 92 and progressively block the light passing therethrough. Accordingly, for a period of time, as the leading edge 34 of the particle 30 travels the distance "h" corresponding to the size of the opening 92, light is progressively blocked until no light passes through the opening 92. In examples, the period between the time at which the leading edge 34 of the particle 30 reaches the beginning of the opening 92 and the time at which the trailing edge 32 of the particle 30 leaves the end of the opening 92, which constitutes a period during which no light passes through the opening 92, may be measured.

In other examples, another period may be measured between the time where the leading edge 34 reaches the end of the opening 92 and the time at which the leading edge 34 reaches the end of the second opening 94, which corresponds to the distance "H" between the first opening 92 and the second opening 94. For example, the time at which the leading edge 34 reaches the end of the opening 92 may be indicated by the time at which a total blocking of the light passing through the opening 92, e.g., 0% of the light passes through the opening 92. In a further example, the time at which the leading edge 34 reaches the end of the second opening 94 may also be determined as the time at which the light passing through the second opening 94 is also blocked, e.g., 0% of the light passes through the opening 94. In other example, the distance between the end of the first opening 92 and the end of the second opening 94 is known as "H." As such, the velocity of the particle 30 traveling between openings 92 and 94 may be calculated according to the equation below:

$$V = H/T_{LE} \qquad \text{Equation (1)}$$

In Equation (1) above, V is the velocity, H is the distance between the end of the first opening 92 and the end of the second opening 94, and $T_{LE}$ is the time it takes for the leading edge 34 of the particle 30 to travel between the end of the first opening 92 and the end of the second opening 94.

In other examples of the above aspect, based on the above determination of the velocity V, the size or length of the particle 30 in the direction 50 may be determined according to Equation (2) below:

$$L = V \times T \qquad \text{Equation (2)}$$

In Equation (2), L is the length of the particle in the direction 50, V is the velocity as, e.g., calculated via Equation (1) above, and "T" is the period of time between the time at which the leading edge 34 of the particle 30 reaches the end of the first opening 92 and the time at which the trailing edge 32 of the particle 30 leaves the end of the first opening 92. In the case of a spherical particle, the length of the particle L corresponds to the diameter of the particle. In various examples, the time at which the leading edge 34 of the particle 30 reaches the end of the first opening 92 may be determined as the time at which the light transmitted through the first opening 92 is completely blocked, or in other words that the signal amplitude is equal to 0% of what it was prior to the particle 30 entering the chamber 20. In further examples, the time at which the trailing edge 32 of the particle 30 leaves the end of the first opening 92 is the time at which the signal amplitude of the light transmitted through the first opening 92 is back to being equal to 100% of what it was prior to the particle 30 entering the chamber 20. Accordingly, by calculating the period of time "T" as discussed above, it is possible to estimate the size, or length "L," of the particle 30 in the direction 50.

In other examples, and referring back to FIG. 1B, the calculations expressed in Equations (1) and (2) may be performed for each pair of openings 92/94 and 92'/94'. Performing the same calculation for both pairs of openings may allow to determine a terminal velocity of the particle when the velocity calculated for the first pair of openings 92/94 is equal to the velocity calculated for the second pair of openings 92'/94'. Such calculation may also provide a level of redundancy in calculating the size of the particle based on Equations (1) and (2) above.

FIG. 2 is a look-up table that can be used to determine a type of material of the flowing particles 30, according to examples of the disclosure. In examples, the table illustrated in FIG. 2 represents a material discrimination algorithm based on trop testing data of, e.g., ferrous and ceramic debris particles, at elevated temperatures. For example, the material discrimination algorithm is based on the temperature of the fluid, the velocity of the particles, and the amplitude or amount of light that is blocked by the particle 30 when passing in front of openings 92/94 or 92'/94'. In examples, the larger the particle, the higher the attenuation of light escaping through the openings 92/94 or 92'/94'. In various examples, the velocity of the particle such as, e.g., the particle 30 discussed, moving through the fluid in the chamber 20 discussed above, may be calculated via Equation (3) below:

$$y = m \times A + b \qquad \text{Equation (3)}$$

In Equation (3), for each temperature T, y is the computed velocity of the particle, and A is the measured 30% amplitude, or the amount of light when 30% of the opening 92/94 is blocked by the particle 30. In example, based on Equation (3), it is then possible to determine the slope "m" and the intercept "b." In other examples, based on the table illustrated in FIG. 2, it is then possible to obtain an indication of the material of the particle passing through the chamber. For example, in FIG. 2, when the temperature T is lower than 75° C., then amplitude sizing may be used. For example, amplitude sizing is the determination of the type of material of the particle by taking into account the size of the particle and the velocity of the particle. For example, when a particle is small and the velocity thereof is large, it may be deduced that the particle is a heavy particle and is likely to have a higher density such as, e.g., steel, silver, lead, or other high-density metal. On the other hand, if the particle is large and the velocity thereof is low, then it may be deduced that the material of the particle has a low density and may be, e.g., a ceramic, polyether ether ketone (PEEK), or aluminum. In another example, when the temperature T is between 75° C. and 90° C., then if the velocity V is greater than the measured velocity "y," the type of material of the particle is metal. If the velocity V is equal to or smaller than the measured velocity "y," then the type of material of the particle is ceramic.

In another example, when the temperature T is equal to 90° or more and lower than 110°, then if the velocity V is greater than the measured velocity "y," then the type of material of the particle is metal. If the velocity V is equal to or smaller than the measured velocity "y," then the type of material of the particle is ceramic.

In a further example, when the temperature T is equal to 110° C. or more and lower than 130° C., then if the velocity V is greater than the measured velocity "y," then the type of material of the particle is metal. If the velocity V is equal to or smaller than the measured velocity "y," then the type of material of the particle is ceramic.

In yet another example, when the temperature T is equal to 130° C. or more and lower than 140° C., then if the velocity V is greater than the measured velocity "y," then the type of material of the particle is metal. If the velocity V is equal to or smaller than the measured velocity "y," then the type of material of the particle is ceramic.

Accordingly, in various examples, it may be possible to obtain an indication of the type of material of the particles that flows through the chamber based on the measured temperature, measured velocity, and the computed velocity based on the table illustrated in FIG. 2.

Figure 4:
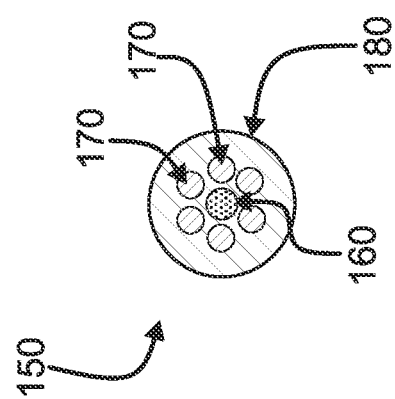
FIGS. 3 and 4 are cross-sectional views generally illustrating examples of a single fiber configuration and a multiple fiber configuration, respectively.
Figure 3:
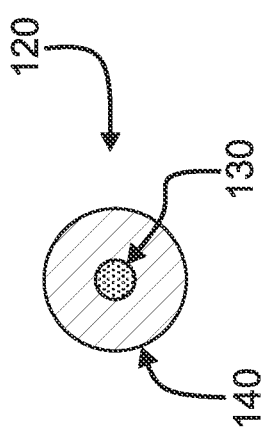

FIGS. 3 and 4 are cross-sectional views generally illustrating examples of a single fiber configuration and a multiple fiber configuration, respectively. FIG. 3 generally illustrates an example of a single fiber configuration, or single fiber optic cable 120. The single fiber configuration/cable 120 may include a single optical fiber 130 and a fiber supporting structure or structural member 140. In examples, the single optical fiber 130 may include an emitter or a detector based on whether the optical fiber 130 is an emitting optical fiber such as, e.g., the light emitter 40/45 discussed above with respect to FIG. 1A, or a light receiver such, e.g., the light receiver 42/48 discussed above with respect to FIG. 1A. FIG. 4 generally illustrates an example of a multiple fiber configuration, or multiple fiber cable 150. The multiple fiber optic configuration, or multiple fiber optic cable 150, may include a first optical fiber (e.g., light emitter or light receiver) 160, a plurality of second optical fibers (e.g., light emitters or light detectors) 170, and a fiber supporting structure (or structural member) 180. In examples, the first optical fiber 160 may include a central optical fiber that may be configured to be a light emitter or light receiver, and the second optical fibers 170 may include light detectors or light emitters and may be arranged or clustered about the first optical fiber 160 (e.g., in a planetary arrangement). The fiber supporting structure 180 may encase both a first optical fiber 160 and a plurality of second optical fibers 170. With examples of systems 10, a single cable, whether having a single fiber (e.g., single fiber optic cable 120) or a multiple fibers (e.g., multiple fiber optic cable 150), may be employed. In examples, the multiple fiber cable 150 may include light emitters or lights detectors based on whether the multiple fiber cable 150 is an emitting optical device such as, e.g., the light emitter 40/45 discussed above with respect to FIG. 1A, or a light receiving device such, e.g., the light receiver 42/48 discussed above with respect to FIG. 1A.

Examples of debris detection systems such as disclosed may provide various advantages. For example and without limitation, such systems: (a) may function in an "on-condition" mode and may be employed "in-line" or in an active/constant fluid stream; (b) may provide independence from debris material or composition (e.g., making it irrelevant if the particle or debris material is comprised of a metal or non-metal (such as, without limitation, a ceramic)); (c) may provide independence (e.g., inherent independence) from temperature; (d) may provide or permit high temperature functionality and capabilities; (e) may be used in conjunction with cyclonic or other forms of separators (e.g., as a supplemental system); and/or may have a single fiber or multiple fiber configuration.

Figure 5:
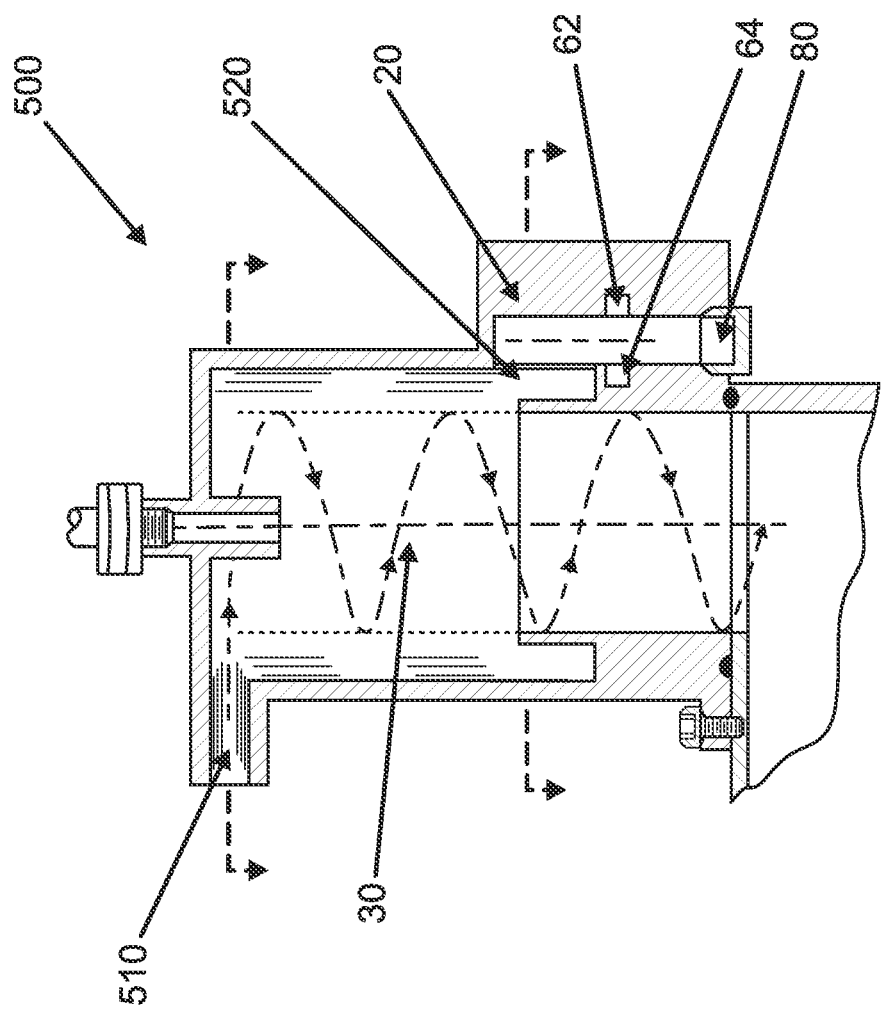
FIG. 5 is a representation of an example of a cyclonic debris separator system configuration.

FIG. 5 is a representation of an example of a cyclonic debris separator system configuration. FIG. 5 is a representation of an example of a cyclonic debris separator system 500 and is described, e.g., in U.S. Pat. No. 7,288,139, which is incorporated herein by reference in its entirety. In examples, a mixture of materials to be separated is introduced in the debris separator 500 via inlet 510, and thereafter flows in a helical vortex that spirals downward through the separator 500 through a debris passage 520 and into a chamber 20 such as, e.g., the chamber 20 discussed above with respect to FIG. 1A. As the separated particles 30 reach the chamber 20, the particles 30 may travel through the chamber 20 from a top portion thereof to a bottom portion thereof. As the separated particles 30 fall through the chamber 20, the particles 30 may pass in front of a light emitting system 62. In various examples, the light emitting system 62 may include a light source and a collimator lens such as, e.g., the light source 45 including the optical fiber 40 and the collimator lens 60 illustrated above with respect to FIG. 1A. In other examples, the cyclonic debris separator 500 also includes a light receiving system 64. In various examples, the light reciting system 64 may include a light receiver and a collimator lens such as, e.g., the light receiver 48 including the optical fiber 42 and the collimator lens 70 illustrated above with respect to FIG. 1A. In other examples, the particles 30 may be collected at a receptable such as, e.g., the receptable 80 illustrated above with respect to FIG. 1A.

Figure 6:
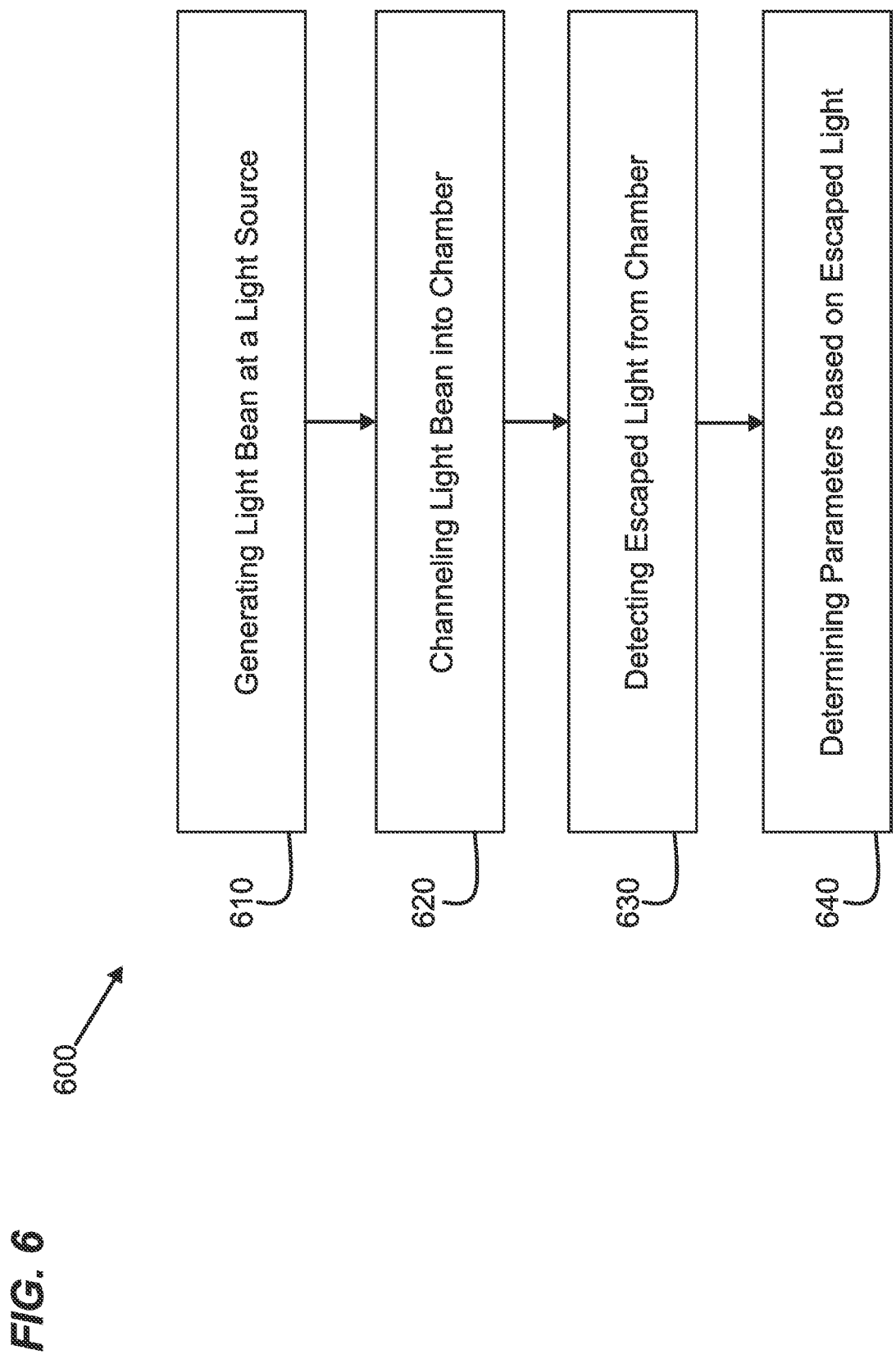
FIG. 6 is a flow chart illustrating a method for detecting one or more particles flowing through a chamber, according to various examples of the disclosure.

FIG. 6 is a flow chart illustrating a method for detecting one or more particles flowing through a chamber, according to various examples of the disclosure. In examples, the method 600 includes operation 610, during which a light beam is generated at a light source. In examples, generating the light beam at the light source may include generating the light beam at one of a first fiber optic cable, a first LED, and a first photo sensor. With reference to FIG. 1A, operation 610 includes generating the light beam 65 at the light source 45 via optical fiber 40. In other examples, operation 620 includes channeling the light beam into a chamber, e.g., via a first collimator lens located outside a sidewall of the chamber. In various examples, channeling the generated light beam into the chamber may include channeling the generated light beam through a transparent sidewall of the chamber. With reference to FIG. 1A, operation 620 includes channeling the light beam 65 into chamber 20 via collimator lens 60 located outside sidewall 22 of the chamber 20.

In other examples, operation 630 includes detecting light that escaped from the chamber via, e.g., a plurality of openings formed at another sidewall of the chamber that is opposite from the transparent sidewall through which the light entered the chamber. In examples, the other sidewall is an opaque sidewall and the light escapes from the chamber via the openings formed in the opaque sidewall. In another example, the escaped light from the chamber may be detected after passing through a second collimator lens located outside the chamber on an opposite side of the chamber from the first collimator lens. For example, detecting the escaped light via the plurality of openings may include receiving the escaped light via a plurality of pairs of openings, and in other examples detecting the escaped light via the plurality of openings may include receiving the escaped light via a one or two pairs of openings. In further examples, detecting the escaped light may include receiving the escaped light via a first pair of openings including a first upper opening and a first lower opening, and via a second pair of openings including a second upper opening and a second lower opening. In various examples, detecting the light escaped from the chamber may include detecting the escaped light at a second fiber optic cable, a second LED, and a second photo sensor. With reference to FIG. 1A, operation 630 includes detecting light that escaped from the chamber 20 via openings 92 and 94 formed at sidewall 24 of the chamber 20.

In further examples, operation 640 includes determining one or more parameters of the one or more particles flowing through the chamber based on the received escaped light using, e.g., any one of Equations (1)-(3). For example, determining the one or more parameters may include determining a size of the one or more particles, or a type of material of the one or more particles. In other examples, determining the one or more parameters may include determining a velocity of a particle based on determined a timing of the particle between openings of one of the pairs of openings. For example, operation 640 may further include determining a length of the particle based on Equation (2) discussed above. In yet another example, the one or more particles that flow through the chamber may be collected at, e.g., a receptacle. For example, the collected particles may be further analyzed, inspected and further tested to determine, e.g., if they are representative of gear or bearing steel, or if they are nuisance debris.

Figure 7:
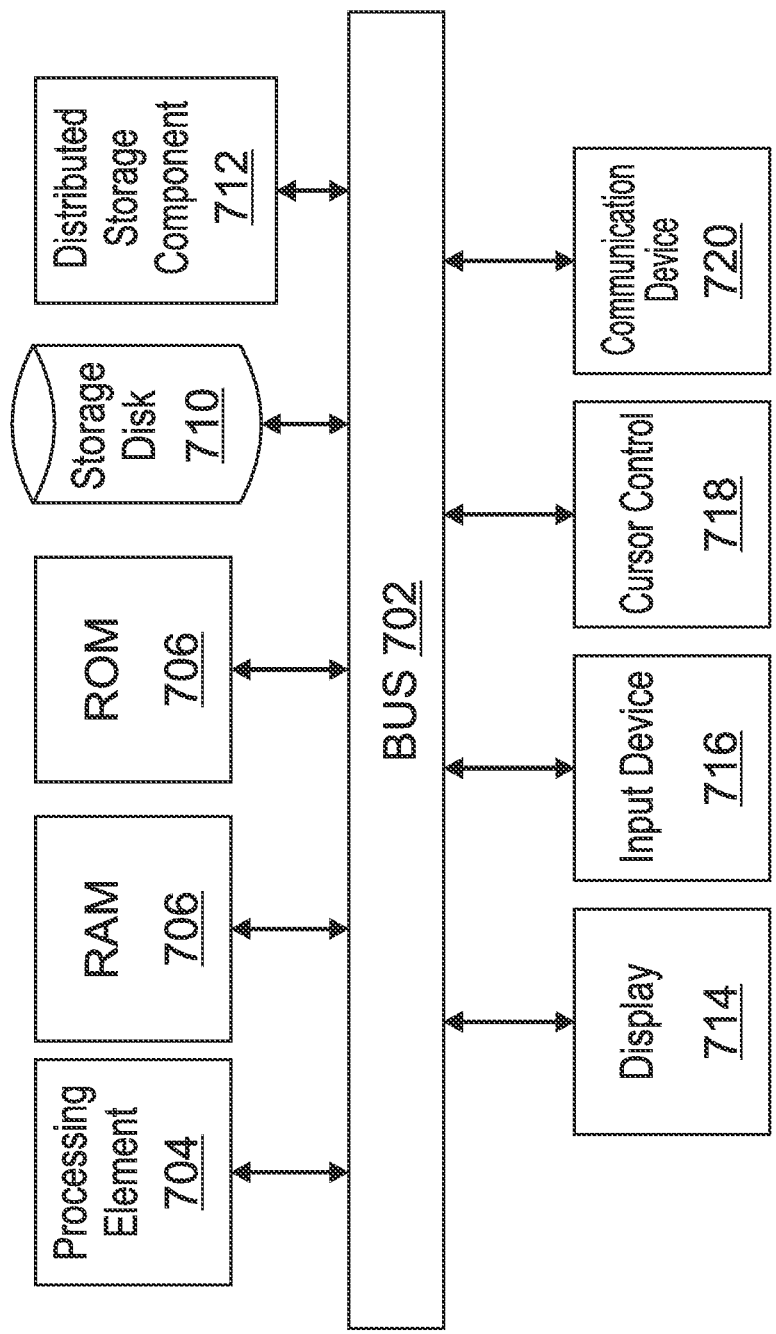
FIG. 7 depicts an example of a suitable operating environment in which one or more of the present examples can be implemented.

FIG. 7 depicts one example of a suitable operating environment 700 in which one or more of the present examples can be implemented. This operating environment may be incorporated directly into the controller for a mass spectrometry or other mass analysis system, e.g., such as the controller 85 depicted in FIG. 1A. This is only one example of a suitable operating environment and is not intended to suggest any limitation as to the scope of use or functionality. Other well-known computing systems, environments, and/or configurations that can be suitable for use include, but are not limited to, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like.

In its most basic configuration, operating environment 700 typically includes at least one processing unit 702 and memory 704. Depending on the exact configuration and type of computing device, memory 704 (storing, among other things, instructions to eject samples, create an ejection time log, identify a known peak shape, etc., or perform other methods disclosed herein) can be volatile (such as RAM), non-volatile (such as ROM, flash memory, etc.), or some combination of the two. This most basic configuration is illustrated in FIG. 7 by dashed line 706. Further, environment 700 can also include storage devices (removable, 708, and/or non-removable, 710) including, but not limited to, magnetic or optical disks or tape. Similarly, environment 700 can also have input device(s) 714 such as touch screens, keyboard, mouse, pen, voice input, etc., and/or output device(s) 716 such as a display, speakers, printer, etc. Also included in the environment can be one or more communication connections 712, such as LAN, WAN, point to point, Bluetooth, RF, etc.

Operating environment 700 typically includes at least some form of computer readable media. Computer readable media can be any available media that can be accessed by processing unit 702 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 700 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein include such modules or instructions executable by computer system 700 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, computer system 700 is part of a network that stores data in remote storage media for use by the computer system 700.

Examples of this disclosure may include the following aspects.

Aspect 1: A particle detection system, including a light source configured to generate a light beam, a first collimator lens outside a chamber and configured to channel the generated light beam from the light source into the chamber through a first sidewall of the chamber, the chamber being configured to hold fluid therein and including a plurality of openings on a second sidewall thereof, the second sidewall being opposite the first sidewall, and a second collimator lens on an opposite side of the chamber from the first collimator lens, the second collimator lens being configured to channel light received from the plurality of openings to a light detector.

Aspect 2: The system of aspect 1, wherein the first sidewall is transparent to the generated light beam, and the second sidewall is opaque to the generated light beam.

Aspect 3: The system of aspect 1 or aspect 2, further including a controller configured to control the light generator and the light detector, wherein the controller and the plurality of openings constitute one or more velocity measurement systems.

Aspect 4: The system of aspect 3, wherein the plurality of openings include one or more pairs of openings, and each velocity measurement system includes one pair of openings including an upper opening and a lower opening.

Aspect 5: The system of aspect 4, wherein the controller is configured to measure a timing of passage of one or more particles flowing through the chamber based on a detected light transmitted through one of the pairs of openings.

Aspect 6: The system of aspect 4 or aspect 5, wherein the one or more velocity measurement systems include a first velocity measurement system including a first upper opening and a first lower opening, and a second velocity measurement system including a second upper opening and a second lower opening.

Aspect 7: The system of aspect 6, wherein the controller is configured to measure a first velocity of the particle at the first velocity measurement system and a second velocity of the particle at the second velocity measurement system.

Aspect 8: The system of aspect 7, wherein the controller is configured to determine a size of the one or more particles based on a comparison of the first velocity and the second velocity.

Aspect 9: The system of any one of aspects 3-8, further including one or more sensors configured to measure a fluid flow through the chamber, wherein the controller is coupled to the one or more sensors.

Aspect 10: The system of any one of aspects 6-9, wherein the controller is configured to calculate a length of a particle as $L=V \times T$, wherein L is a length of the particle, V is a velocity of the particle passing through one of the first velocity measurement system and the second velocity measurement system, and T a period between a time at which a leading edge of the particle reaches an end of a first opening of the one of the first velocity measurement system and the second velocity measurement system, and a time at which the leading edge of the particles reaches an end of a second opening of the one of the first velocity measurement system and the second velocity measurement system.

Aspect 11: The system of aspect 10, wherein at least one of the light source and the light detector includes a fiber optic cable, the fiber optic cable including one of a single optical fiber and a plurality of optical fibers.

Aspect 12: The system of aspect 10 or aspect 11, wherein each of the light source and the light detector includes one of an LED, a photo sensor, and a fiber optic cable.

Aspect 13: The system of any one of aspects 1-12, further including a receptable configured to collect the particles flowing through the chamber, the receptable being located downstream from the chamber in a direction of the particle.

Aspect 14: A method for detecting one or more particles flowing through a chamber, the method including generating a light beam at a light source, channeling the generated light beam into the chamber via a first collimator lens outside a first sidewall of the chamber, detecting light escaped from the chamber via a plurality of openings, the plurality of openings being formed at a second sidewall of the chamber opposite the first sidewall, at a light detector via a second collimator lens located outside the second sidewall, and determining one or more parameters of the one or more particles flowing through the chamber based on the received escaped light.

Aspect 15: The method of aspect 14, wherein detecting the escaped light via the plurality of openings includes receiving the escaped light via a plurality of pairs of openings.

Aspect 16: The method of aspect 15, wherein detecting the escaped light via the plurality of openings includes receiving the escaped light via one of one pair of openings and two pairs of openings.

Aspect 17: The method of aspect 16, wherein detecting the escaped light includes receiving the escaped light via a first pair of openings including a first upper opening and a first lower opening, and via a second pair of openings including a second upper opening and a second lower opening.

Aspect 18: The method of any one of aspects 14-17, wherein determining the one or more parameters includes determining one or more of a size of the one or more particles, and a type of material of the one or more particles.

Aspect 19: The method of any one of aspects 15-18, wherein determining the one or more parameters includes determining a velocity of a particle based on determined a timing of the particle between openings of one of the pairs of openings.

Aspect 20: The method of aspect 19, further including determining a length of the particle as L=V×T, wherein L is a length of the particle, V is a velocity of the particle passing through one of the first velocity measurement system and the second velocity measurement system, and T a period between a time at which a leading edge of the particle reaches an end of a first opening of the one of the first velocity measurement system and the second velocity measurement system, and a time at which the leading edge of the particles reaches an end of a second opening of the one of the first velocity measurement system and the second velocity measurement system.

Aspect 21: The method of any one of aspects 14-20, wherein generating the light beam at the light source includes generating the light beam at one of a first fiber optic cable, a first LED, and a first photo sensor, detecting the light escaped from the chamber includes detecting the escaped light at a second fiber optic cable, a second LED, and a second photo sensor.

Aspect 22: The method of any one of aspects 14-21, wherein channeling the generated light beam into the chamber includes channeling the generated light beam through a first transparent sidewall of the chamber.

Aspect 23: The method of any one of aspects 14-22, wherein detecting the light escaped from the chamber includes detecting the light escaped from a second opaque sidewall of the chamber, the second opaque sidewall including the plurality of openings.

Aspect 24: The method of any one of aspects 14-23, further including collecting the one or more particles that flowed through the chamber in a receptable.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A particle detection system, comprising:
a light source configured to generate a light beam;
a first collimator lens outside a chamber and configured to channel the generated light beam from the light source into the chamber through a first sidewall of the chamber;
the chamber being configured to hold fluid therein and comprising a plurality of openings on a second sidewall thereof, the second sidewall being opposite the first sidewall; and
a second collimator lens on an opposite side of the chamber from the first collimator lens, the second collimator lens being configured to channel light received from the plurality of openings to a light detector.

2. The system of claim 1, wherein:
the first sidewall is transparent to the generated light beam; and
the second sidewall is opaque to the generated light beam.

3. The system of claim 1, further comprising a controller configured to control the light generator and the light detector, wherein the controller and the plurality of openings constitute one or more velocity measurement systems.

4. The system of claim 3, wherein:
the plurality of openings comprise one or more pairs of openings; and
each velocity measurement system comprises one pair of openings comprising an upper opening and a lower opening.

5. The system of claim 4, wherein the controller is configured to measure a timing of passage of one or more particles flowing through the chamber based on a detected light transmitted through one of the pairs of openings.

6. The system of claim 4, wherein the one or more velocity measurement systems comprise a first velocity measurement system comprising a first upper opening and a first lower opening, and a second velocity measurement system comprising a second upper opening and a second lower opening.

7. The system of claim 6, wherein the controller is configured to measure a first velocity of the particle at the first velocity measurement system and a second velocity of the particle at the second velocity measurement system.

8. The system of claim 7, wherein the controller is configured to determine a size of the one or more particles based on a comparison of the first velocity and the second velocity.

9. The system of claim 6, wherein the controller is configured to calculate a length of a particle as L=V×T; wherein L is a length of the particle, V is a velocity of the particle passing through one of the first velocity measurement system and the second velocity measurement system, and T a period between a time at which a leading edge of the particle reaches an end of a first opening of the one of the first velocity measurement system and the second velocity measurement system, and a time at which the leading edge of the particles reaches an end of a second opening of the one of the first velocity measurement system and the second velocity measurement system.

10. The system of claim 9, wherein at least one of the light source and the light detector comprises a fiber optic cable, the fiber optic cable comprising one of a single optical fiber and a plurality of optical fibers.

11. The system of claim 9, wherein each of the light source and the light detector comprises one of an LED, a photo sensor, and a fiber optic cable.

12. The system of claim 3, further comprising one or more sensors configured to measure a fluid flow through the chamber, wherein the controller is coupled to the one or more sensors.

13. The system of claim 1, further comprising a receptable configured to collect the particles flowing through the chamber, the receptable being located downstream from the chamber in a direction of the particle.

14. A method for detecting one or more particles flowing through a chamber, the method comprising:
generating a light beam at a light source;
channeling the generated light beam into the chamber via a first collimator lens outside a first sidewall of the chamber;
detecting light escaped from the chamber via a plurality of openings, the plurality of openings being formed at a second sidewall of the chamber opposite the first sidewall, at a light detector via a second collimator lens located outside the second sidewall; and
determining one or more parameters of the one or more particles flowing through the chamber based on the received escaped light.

15. The method of claim 14, wherein detecting the escaped light via the plurality of openings comprises receiving the escaped light via a plurality of pairs of openings.

16. The method of claim 15, wherein detecting the escaped light via the plurality of openings comprises receiving the escaped light via one of one pair of openings and two pairs of openings.

17. The method of claim 16, wherein detecting the escaped light comprises receiving the escaped light via a first pair of openings comprising a first upper opening and a first lower opening, and via a second pair of openings comprising a second upper opening and a second lower opening.

18. The method of claim 15, wherein determining the one or more parameters comprises determining a velocity of a particle based on determined a timing of the particle between openings of one of the pairs of openings.

19. The method of claim 18, further comprising determining a length of the particle as $L=V \times T$;
wherein L is a length of the particle, V is a velocity of the particle passing through one of the first velocity measurement system and the second velocity measurement system, and T a period between a time at which a leading edge of the particle reaches an end of a first opening of the one of the first velocity measurement system and the second velocity measurement system, and a time at which the leading edge of the particles reaches an end of a second opening of the one of the first velocity measurement system and the second velocity measurement system.

20. The method of claim 14, wherein determining the one or more parameters comprises determining one or more of a size of the one or more particles, and a type of material of the one or more particles.

21. The method of claim 14, wherein:
generating the light beam at the light source comprises generating the light beam at one of a first fiber optic cable, a first LED, and a first photo sensor;
detecting the light escaped from the chamber comprises detecting the escaped light at a second fiber optic cable, a second LED, and a second photo sensor.

22. The method of claim 14, wherein channeling the generated light beam into the chamber comprises channeling the generated light beam through a first transparent sidewall of the chamber.

23. The method of claim 14, wherein detecting the light escaped from the chamber comprises detecting the light escaped from a second opaque sidewall of the chamber, the second opaque sidewall comprising the plurality of openings.

24. The method of claim 14, further comprising collecting the one or more particles that flowed through the chamber in a receptable.

* * * * *